May 30, 1961     A. M. J. F. MICHELS     2,986,641
APPARATUS FOR EVACUATING WASTE HYDROGEN FROM A CHAMBER
IN WHICH NEUTRONS ARE PRODUCED
Filed Aug. 8, 1957

INVENTOR.
Antonious Mathias Johannes Friedrich Michels
BY
Popp and Sommer
ATTORNEYS.

United States Patent Office 2,986,641
Patented May 30, 1961

2,986,641

APPARATUS FOR EVACUATING WASTE HYDROGEN FROM A CHAMBER IN WHICH NEUTRONS ARE PRODUCED

Antonius Mathias J. F. Michels, Amsterdam, Netherlands, assignor, by mesne assignments, to Seismograph Service Corporation, Tulsa, Okla., a corporation of Delaware Filed Aug. 8, 1957, Ser. No. 677,033

1 Claim. (Cl. 250—84.5)

This invention relates to apparatus for evacuating the waste hydrogen produced by the bombardment of deuterium or tritium with positive ions in the production of high energy neutrons.

In producing high energy neutrons it has been the practice to introduce deuterium or tritium into an evacuated vessel on envelope of glass or similar material which was substantially pervious to neutrons. The required condition of evacuation was maintained in the envelope by a suitable vacuum pump, by a getter, or by one of the electrodes being formed of a material to act as a getter. The deuterium or tritium was introduced into the envelope through a thin wall of palladium or platinum, also preferably serving as one of the electrodes, the rate of flow of the deuterium or tritium through the wall, generally at a rate measured in molecules per second, being a function of the differential in concentration of the molecules on opposite sides of the wall and also the temperature of the wall and this rate being controlled by electrical resistance heating in which the palladium or platinum was used as the resistance element.

The molecules of deuterium and tritium migrating through the palladium or platinum wall formed a layer or sheath on the evacuated side of the palladium or platinum wall and diffused into the evacuated envelope. With the palladium or platinum wall positively charged to serve as an anode, it has been the practice to bombard the layer of these molecules with electrons produced, as by cold emission, from a cathode in the envelope arranged in space relation to the anode. The positively charged deuterium ions resulting from this bombardment were accelerated by the electric field between the palladium or platinum anode in their movement toward the cathode which acted as a target. The bombarded surface of the cathode was coated with a material containing deuterium or tritium bound in, say, zirconium which also acted as a getter in abstracting the deuterium or tritium from the evacuated envelope to provide it in the target material. This bombardment by the positively charged ions of the deuterium or tritium in the target coating caused a nuclear reaction resulting in the production of high energy neutrons. These passed through the glass envelope and were collected in any suitable manner.

If the palladium or platinum wall were negatively charged to serve as a cathode, a high voltage was applied across the cathode and a spaced anode in the evacuated envelope to produce a glow discharge between these electrodes and a large quantity of positively charged ions of deuterium. These positive ions were driven toward the palladium or platinum cathode and accelerated to a relatively high velocity so that when they collided with the sheath of deuterium or tritium which had migrated through and formed on the surface of the palladium or platinum wall of the cathode they produced a continuous supply of high velocity neutrons.

Regardless of how the neutrons are produced the nuclear reaction of the tritium or deuterium produces normal hydrogen as a waste product. If the concentration of the hydrogen in the evacuated envelope becomes too great the deuterium ions cannot be accelerated to the required degree.

It is the purpose of the present invention to abstract this waste hydrogen from the evacuated envelope as it forms, thereby to avoid impeding the acceleration of the deuterium ions to the degree required to produce high enery monoenergetic neutrons.

The accompanying drawing is a longitudinal sectional view of an embodiment of the invention showing the associated electrical components and circuits schematically.

The embodiment of the invention is shown as including a cylindrical envelope 1 of glass or other suitable material which is substantially pervious to neutrons and is shown as having its opposite ends enclosed by integral end heads 2, 3 which seal the interior chamber 4 of the envelope 1 from the atmosphere, this interior chamber 4 being evacuated. The numeral 5 represents a tubular electrode, the wall of which is very thin and is composed of palladium or platinum through which molecules of hydrogen and its heavier isotopes, that is deuterium or tritium, can pass in one direction when such molecules are supplied to the space on one side of said wall and when such molecules are removed from the space on the opposite side of the wall. The rate of migration through the wall of the electrode 5 is increased by heating the wall and in the example of apparatus shown in the drawing the electrode 5 is an anode. The inner end of the tubular anode 5 is closed or capped and the outer end is hermetically sealed to the end head 2. Deuterium or tritium is supplied under pressure to the interior of the tubular anode 5 from a high pressure source (not shown) by a supply line 6 which is hermetically sealed in the end head 2 and communicates through a passage 7 with the interior of the tubular anode 5. Upon heating the wall of the tubular anode 5 to the desired temperature, for example by means of an electrical resistance element 8 extending along its interior, the molecules of deuterium or tritium supplied under pressure within the tubular anode 5 migrate through the thin wall of the anode into the evacuated space 4 surrounding the anode and which is maintained at a relatively low pressure, for example, in the range of $10^{-4}$ to $10^{-6}$ millimeters of mercury. The rate of passage of the deuterium or tritium through the wall of the anode 5, and which is measured in terms of molecules per second, is a function of the differential in concentration of molecules on opposite sides of this wall as well as of the wall temperature maintained by the resistance heating coil 8. This heating effect is controllable and is supplied from a source (not shown) through conductors 10 and 11 under control of a rheostat 12. The wall temperature of the anode is preferably held in an operating range of from 200–300° C.

The numeral 13 represents a hollow, open ended cylindrical cathode which may be constructed of a number of metals, such as, for example, nickel, tantalum, or tungsten, but is preferably constructed of outgassed zirconium or uranium. On the inner surface of the cathode 13 is deposited or plated a coating of target material 13, which contains the elements or compounds upon which it is desired to impinge relatively high velocity charged particles. For example, the target material may contain deuterium or tritium bound in zirconium or tantalum. When constructed of uranium or zirconium the cathode 13 will perform the additional function of a getter for any non-ionized tritium or deuterium, the cathode being heated by bombardment with ions as hereinafter described.

The cathode 13 is shown as being grounded as indicated at 14 and a high voltage potential is maintained across the anode 5 and cathode 13 from a high voltage source 15 under control of a voltage divider 16 having its movable contact connected by a line 18 with the cathode 13 and its other side grounded as indicated at 19. The anode 5 can be maintained at a positive potential of from 20 to 100 kilovolts with respect to the cathode 13.

With this potential between the anode 5 and the cathode 13 and with the heating coil 8 energized to establish a wall temperature in the anode 5 sufficient to allow a slow migration of deuterium or tritium molecules through the palladium or platinum anode wall, these molecules escape to the outer surface of the anode 5 where they tend to accumulate as a sheath or layer. This sheath or layer of deuterium or tritium molecules is bombarded by electrons of from 20 to 100 kiloelectron volt energy, released from the cathode 13, as by cold emission. The electron bombardment of the sheath of molecules of gas on the anode 5 produces positively charged deuterium ions or deuterons. These deuterons are accelerated by the electrostatic field between the anode 5 and the cathode 13 and impinge against the cathode 13 with energies of from 20 to 100 kiloelectron volts. These energies are sufficient to cause the deuterons to react nuclearly with the tritium or deuterium contained in the coating 14 to produce high energy, monoenergetic neutrons.

The production of the neutrons as above described or in any other apparatus involving the bombardment of deuterium or tritium molecules with accelerated ions results in the production of hydrogen as a waste product. If this hydrogen were permitted to accumulate in the evacuated envelope 1 the free movement of the charged particles or ions bombarding the cathode 13 would be hindered. It is the purpose of the present invention to continuously remove this waste hydrogen.

To this end the numeral 20 represents a tube, the wall of which is very thin and is composed of palladium or platinum through which molecules of hydrogen can pass. The inner end of the tube 20 is closed or capped and the outer end is hermetically sealed to the end head 3. One face of the tube 20 is exposed to the interior of the evacuated chamber 4 and the other face of the tube 20 is exposed to the chamber 21 formed by the tube 20 and from which the molecules of waste hydrogen are removed. Oxygen is supplied to the interior chamber 21 of the tube 20 from a source (not shown) by a supply line 22 which is hermetically sealed in the end head 3 and communicates through a passage 23 with the interior of the tube 20. It will be seen that an atmosphere of oxygen is provided within the tube 20.

The numeral 24 represents a piece of platinum gauze arranged within the tube 20 and heated so as to accelerate its action as a catalyst and also to heat the walls of the tube 20 in order to facilitate the migration of hydrogen molecules therethrough. Such heat can be supplied by using the gauze 24 as a resistance heating element, the heating effect being supplied from a source (not shown) through conductors 26 and 28 under control of a rheostat 29.

The catalytic action of the platinum gauze 24 combines the hydrogen emerging through the wall 20 with the oxygen supplied from the line 22 to produce water. The water or moisture so produced can conveniently be abstracted by a suitable hydrophylic substance such as a cartridge 30 removably contained within the passage 23 and composed of or containing an absorbent or adsorbent or hydrophilic oxides, hydroxides or metals, such as phosphoric anhydride, potassium hydroxide or sodium.

Operation

With deuterium or tritium under pressure supplied through the line 6 to the interior of the anode 5, and oxygen supplied to the interior 21 of the tube 20 from the supply line 22, and with suitable regulation, through the rheostat 12, of the heating effect of the resistance heating coil 8, molecules of deuterium or tritium migrate through the thin wall of the anode 5 and tend to collect as a sheath on the exterior of the anode and within the evacuated space 4 provided by the glass envelope 1. Due to the high voltage differential maintained between the anode 5 and cathode 13 from the high voltage source 15 under control of the voltage divider 16, electrons are released from the cathode 13 by cold emission and bombard the sheath of molecules on the anode 5 to produce positively charged deuterium ions. These ions move toward the cathode 13, being accelerated by the field between the anode and the cathode, and impinge against the coating 14 of the cathode 13 with energies sufficient to cause the deuterium ions to produce high energy neutrons from the deuterium or tritium bound in the coating, through nuclear reaction. This nuclear reaction produces normal hydrogen as a waste product and which must be removed from the chamber 4 formed by the evacuated envelope 1 before the concentration becomes too great to interfere with the acceleration of the deuterium ions toward the cathode 13.

To eliminate the normal hydrogen from the envelope 1 current is passed through the platinum gauze 24 under control of the rheostat 29 to heat both the wall of the tube 20 and also the platinum gauze 24. Such heating of the thin wall of the palladium or platinum wall 20 facilitates the migration of hydrogen molecules therethrough. This monodirectional migration to the chamber 21 is caused by removal of the hydrogen molecules from the space 21 within the tube 20. Thus these hydrogen molecules, on encountering the heated platinum gauze 24, react with the oxygen atmosphere within the tube 20 to produce water, the heated platinum gauze 24 acting as a catalyst. This water or moisture is absorbed, chemically bound or adsorbed by the cartridge 30.

Instead of palladium or platinum the wall of the tube 20 could be composed of any material selectively permeable to hydrogen in terms of the other atoms and molecules in the system, such being oxygen in the present example.

From the above it will be seen that the present invention provides a simple and effective apparatus for preventing the excessive build-up of waste hydrogen in an evacuated nuclear reactor in the production of high energy neutrons from deuterium or tritium and that it acts continuously without the requirement for close supervision.

I claim:

Apparatus for producing neutrons and evacuating the resulting waste hydrogen comprising means providing a chamber having a first thin wall and a second thin wall each composed of a material selectively permeable to hydrogen and its isotopes in terms of the various atoms and molecules in the system and said material being selected from the group consisting of palladium and platinum, means supplying isotopes of hydrogen selected from the group consisting of deuterium and tritium to the side of said first wall opposite said chamber, means heating said first wall to cause migration of said isotope molecules through said first wall to emerge into said chamber, means arranged in said chamber and effecting bombardment between said isotopes and oppositely charged ions to produce high energy neutrons and waste hydrogen in said chamber, means providing an atmosphere of oxygen at the face of said second wall opposite said chamber, a platinum grid alongside said opposite face of said second wall, means heating said second wall and platinum grid to a temperature to cause migration of said waste hydrogen molecules from said chamber to emerge from the opposite face thereof and to render said platinum grid effective as a catalyst in combining said emerging hydrogen molecules with said oxygen to produce water, and an absorbent for water arranged in said atmosphere of oxygen to abstract said water therefrom.

References Cited in the file of this patent

UNITED STATES PATENTS

| | | |
|---|---|---|
| 1,174,631 | Snelling | Mar. 7, 1916 |
| 1,213,470 | Finlay | Jan. 23, 1917 |
| 1,871,226 | Skala | Aug. 9, 1932 |
| 2,489,436 | Salisbury | Nov. 29, 1949 |
| 2,609,382 | Mayland | Sept. 2, 1952 |
| 2,735,019 | Dewan et al. | Feb. 14, 1956 |

FOREIGN PATENTS

| | | |
|---|---|---|
| 573,018 | Great Britain | Nov. 2, 1945 |